(12) United States Patent
Le Breton et al.

(10) Patent No.: US 7,697,616 B2
(45) Date of Patent: Apr. 13, 2010

(54) METHOD OF MODULATION AND DEMODULATION OF A DIGITAL SIGNAL, IN A FREQUENCY BAND AFFECTED BY FLAT FADING, ASSOCIATED MODULATOR AND DEMODULATOR

(75) Inventors: Bruno Le Breton, Boulogne (FR); Pierre Vasseur, Maule (FR); Patrick Bureau, Bessancourt (FR)

(73) Assignee: Thales (FR)

( * ) Notice: Subject to any disclaimer, the term of this patent is extended or adjusted under 35 U.S.C. 154(b) by 1232 days.

(21) Appl. No.: 10/539,622

(22) PCT Filed: Dec. 15, 2003

(86) PCT No.: PCT/EP03/51003

§ 371 (c)(1),
(2), (4) Date: Jun. 17, 2005

(87) PCT Pub. No.: WO2004/056059

PCT Pub. Date: Jul. 1, 2004

(65) Prior Publication Data

US 2006/0133520 A1 Jun. 22, 2006

(30) Foreign Application Priority Data

Dec. 17, 2002 (FR) ................................. 02 16007

(51) Int. Cl.
*H04K 1/10* (2006.01)
(52) U.S. Cl. .................... 375/260; 375/135; 375/146; 375/259; 375/301; 375/340

(58) Field of Classification Search .................. 375/260
See application file for complete search history.

(56) References Cited

U.S. PATENT DOCUMENTS 6,704,297 B1 * 3/2004 Wright et al. ............ 370/310.1
6,801,570 B2 * 10/2004 Yong .......................... 375/219

(Continued)

FOREIGN PATENT DOCUMENTS

GB       2-271-693 A       4/1994

(Continued)

OTHER PUBLICATIONS

Wong C Y et al: "Multiuser OFDM With Adaptive Subcarrier, BIT, and Power Allocation" IEEE Journal on Selected Areas in Commuications, IEEE Inc. New York, US, vol. 17, No. 10, Oct. 1999 pp. 1747-1758.

(Continued)

*Primary Examiner*—Shuwang Liu
*Assistant Examiner*—Dhaval Patel
(74) *Attorney, Agent, or Firm*—Lowe Hauptman Ham & Berner, LLP

(57) ABSTRACT

A method of modulating a digital signal of width L in frequency on a given useful frequency band is described The digital signal is separated into N blocks $b_n$ ($1 \leq n \leq N$). The given useful frequency band is split into N contiguous parts $P_n$. Channels $C_n$, of width $1_n$ in frequency, lying within an associated part $P_n$, are defined. The channels $C_n$ are separated, a distributing of each block of digital signals $b_n$ over the associated channel $C_n$.

13 Claims, 3 Drawing Sheets

U.S. PATENT DOCUMENTS

| | | | |
|---|---|---|---|
| 7,046,694 B2 * | 5/2006 | Kumar | 370/487 |
| 7,272,162 B2 * | 9/2007 | Sano et al. | 375/135 |
| 7,366,088 B2 * | 4/2008 | Bolinth et al. | 370/203 |
| 7,447,163 B1 * | 11/2008 | Thomson et al. | 370/252 |

FOREIGN PATENT DOCUMENTS

| WO | 98/58471 A | 12/1998 |
|---|---|---|
| WO | 00/31939 A | 6/2000 |

OTHER PUBLICATIONS

Lassalle R et al: "Principles of Modulation and Channel Coding for Digital Broadcasting for Mobile Receivers" Ebu review-Technical, European Broadcasting Union, Brussels, BE No. 224; Aug. 1, 1987.

Bureau P et al: "Digital Broadcasting in Am Bands: A Reality" Annual Broadcast Engineering Conference Proceedings, Apr. 1998, pp. 105-113.

* cited by examiner

METHOD OF MODULATION AND DEMODULATION OF A DIGITAL SIGNAL, IN A FREQUENCY BAND AFFECTED BY FLAT FADING, ASSOCIATED MODULATOR AND DEMODULATOR

CROSS-REFERENCE TO RELATED APPLICATIONS

The present Application is based on International Application No. PCT/EP2003/051003, filed on Dec. 15, 2003, which in turn corresponds to FR 02/16007 filed on Dec. 17, 2002, and priority is hereby claimed under 35 USC §119 based on these applications. Each of these applications are hereby incorporated by reference in their entirety into the present application.

FIELD OF THE INVENTION

The invention relates to the modulation of digital signals on a given useful frequency band, in particular the FM band, and the associated demodulation.

DESCRIPTION OF RELATED ART

The last two decades have seen the appearance of audio storage means of excellent quality. This sound quality has been obtained, in particular, by storing not only the analog signal but its digital version. Thus, digital compact discs have surpassed existing radio broadcasting in terms of quality of the sound reproduced. This difference in sound quality is so important that it has given rise to a modification of the market: listeners preferring to listen to audio compact discs than radio.

Several digital broadcasting standards have thus been developed in order to improve the sound quality of the broadcast signal: DAB, DRM etc. DAB (Digital Audio Broadcasting), developed to eventually replace FM broadcasting, offers the advantage of great robustness to the multipath phenomenon is especially well suited to mobile reception. However, it presents several major drawbacks, the cost of deployment in particular for a network with wide geographical coverage, the need to create a bundle of programs or to partner with other radio broadcasters and finally a relatively high cost of the receivers.

The analog FM band being saturated, the first idea for increasing the local coverage capacity was to use low-power transmitters in DRM digital mode either in medium wave or at the top of the shortwave band (26 MHz) that is scarcely employed by international radio broadcasters. To do this, the AM band, listened to less and less on account of the mediocre quality of the sound reproduced, had to be revalued. The solution proposed by DRM radio broadcasting is the transmission of the signal in digital form in the AM band. The sound quality of the reception of a digital broadcasting system using the AM band according to the DRM standard is thereby considerably improved: sound quality close to that of analog FM broadcasting or even superior under reception conditions subject to multipaths with possibilities of data services associated or otherwise with the audio program.

As all broadcasting operators know, the resources allocated to radio broadcasting are limited. The AM band, even used in digital, will quickly be saturated. Moreover, though the use of these AM bands for local coverage is turning out to be very effective to date, it is very difficult to eliminate any risk of ionospheric propagation that might create undesirable interference in other zones of coverage, even very distant ones. It would therefore be beneficial to profit from the existing techniques of broadcasting in the AM band and to transpose them to the FM band.

Unfortunately, the FM band presents a major drawback in respect of digital transmission. It is a harsh environment subject to multipaths. Hence, the main problem of the FM band is a propagation problem called spatial fading or flat fading. This fading of the signal is related to a phenomenon of local interference and depends on the place where the receiver is located and on the frequency.

SUMMARY OF THE INVENTION

The present invention makes it possible to alleviate these drawbacks by using the principle that the fading is different depending on the frequency used. The digital signal is divided into several blocks, each being transmitted on the band in a separate channel from the transmission channels of the other blocks. Thus, when the signal fads on a frequency, only one block is affected: there is no abrupt loss of information.

A subject of the invention is a method of modulating a digital signal of width L in frequency on a given useful frequency band comprising the following steps:

a separation of the digital signal into N blocks $b_n$ ($1 \leq n \leq N$), a splitting of the given useful frequency band into N contiguous parts $P_n$, a definition of channels $C_n$, of width $l_n$ in frequency, lying within an associated part $P_n$, a distributing of each block of digital signals $b_n$ over the associated channel $C_n$.

This method of modulation can define the channels $C_n$ by taking account of a predetermined minimum distance between these channels. This minimum distance between the channels can be determined as a function of the number N of channels, of their width $l_n$ so that a minority of channels are affected by the phenomenon of flat fading.

Another subject of the invention is the modulator of digital signals over a given useful frequency band implementing this method of modulation and comprising:

means of separation of the digital signal into N blocks $b_n$ ($1 \leq n \leq N$), means of splitting of the given useful frequency band into N contiguous parts $P_n$, means of definition of channels $C_n$ of width $l_n$ in frequency, lying within an associated part $P_n$, means of distributing of each block of digital signals $b_n$ over the associated channel $C_n$.

Furthermore, the invention proposes a demodulator of digital signals conveyed on a given useful frequency band by a transmitter comprising a modulator as described above. The modulator comprises:

means of scanning of the N channels $C_n$ making it possible to read the N blocks $b_n$ of signals distributed over these channels, means of recombination of the N blocks read $\hat{b}_n$ in the N channels $C_n$ into a digital signal $\hat{s}[m]$.

Moreover, the subject of the invention is a transmitter of digital signals on a given useful frequency band comprising at least one transmission chain comprising a modulator such as that described hereinabove. The transmission chain comprises an error corrector coder conveying the coded digital signal to the modulator.

According to the invention, there is also proposed a receiver of digital signals conveyed on a given useful frequency band by this transmitter. The receiver comprises a demodulator such as described hereinabove and a decoder associated with the error corrector coder of the transmitter receiving the digital signal recombined ŝ[m] by the demodulator.

In a variant of the invention is proposed the use of the transmitter and of the receiver described hereinabove for the transmission of digital signals in the FM band.

The characteristics and advantages of the invention will become more clearly apparent on reading the description, given by way of example, and of the appended figures which represent:

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

DETAILED DESCRIPTION OF THE INVENTION

Figure 1:
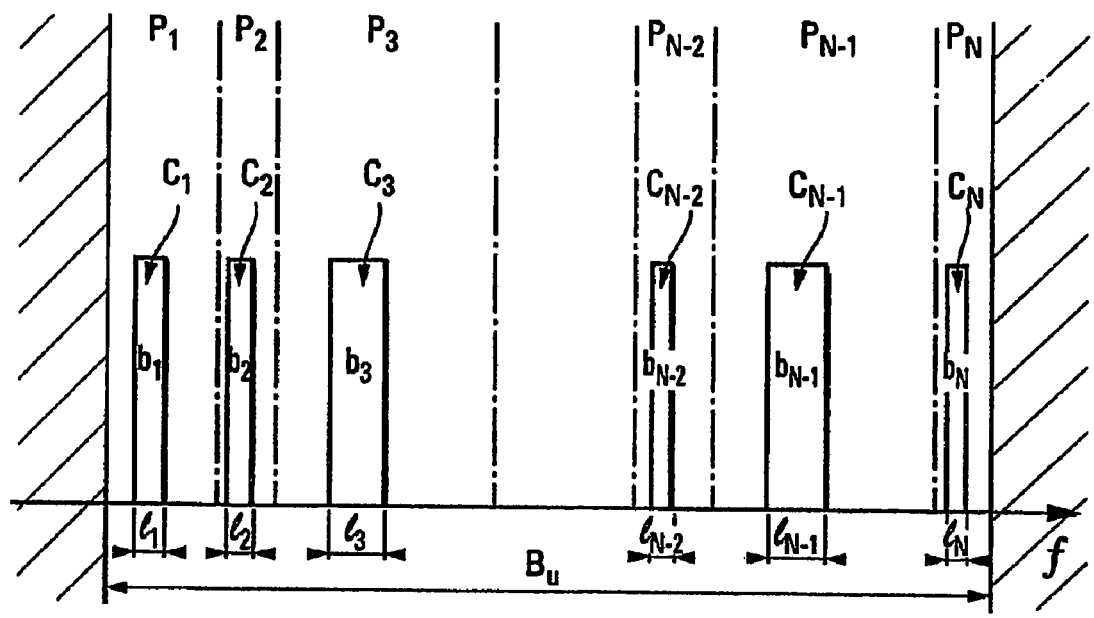
FIG. 1, a general frequency representation of the use of the given useful frequency band during the transmission of a digital signal according to the invention, FIG. 2, a frequency representation of an example of use of the FM band during the transmission of a digital signal on two distinct channels according to the invention, FIG. 3, a general frequency representation of the use of the given useful frequency band during the transmission of several digital signals according to the invention, FIG. 4, a simplified diagram of a modulator of digital signals on a given useful frequency band according to the invention, FIG. 5, a simplified diagram of a demodulator of digital signals conveyed on a given useful frequency band according to the invention, FIG. 6, a simplified diagram of a transmitter of digital signals on a given useful frequency band comprising several transmission chains according to the invention, FIG. 7, a simplified diagram of a receiver of digital signals conveyed on a given useful frequency band according to the invention.

FIG. 1 represents the use of the given useful frequency band $B_u$ by the digital signal during its transmission. The method of modulation according to the invention divides the digital signal s[m] into N blocks $b_1$ to $b_N$. The digital signal s[m] having a frequency width equal to L, each of the N blocks $\{b_n\}_{(1 \leq n \leq N)}$ has a respective frequency width $l_n$ such that their sum is equal to that of the signal s[m]:

$$\sum_{n=1}^{N} l_n = L.$$

The given useful frequency band is itself divided into N parts $P_n$. In each of these parts $P_n$ is defined a channel $C_n$ of width $l_n$ in which the signal of the associated block $b_n$ will be distributed.

The widths $l_n$ of the channels $C_n$ may all be different ($l_1 \neq l_2 \neq \ldots \neq l_N$), equal ($l_1 = l_2 = \ldots = l_N$) or else some of them may be equal and others different ($l_f = l_g = \ldots = l_h, \ldots l_i = l_j = \ldots = l_k$ and $l_a \neq l_b \neq \ldots \neq l_c, l_e \neq l_f \neq \ldots \neq l_g$, $1 \leq a,b,c,f,g,h,i,j,k \leq N$). If the N channels $C_n$ are of identical widths, their width is equal to an Nth of the width of the digital signal L: $l_n = L/N$, $\forall 1 \leq n \leq N$.

During definition of the channels $C_n$, the latter are separated. This separation is equal to a predetermined minimum distance. The minimum distance between the channels $C_i$ and $C_{i+1}$ may be different from the predetermined distance between the channels $C_j$ and $C_{j+1}$. The minimum distance may be determined as a function of the number N of channels $\{C_n\}$, of their width $l_n$, and of the mean width of the frequency band affected by the phenomenon of flat fading. This minimum distance allows a predetermined maximum number of blocks $\{b_n\}$ to be affected by the phenomenon of flat fading. Thus, the loss of information is not abrupt. This maximum number may be determined such that a minority, of channels $C_n$/blocks $b_n$ is affected.

This method of modulation may therefore be used for the transmission on all frequency bands liable to be affected by the phenomenon of flat fading, in particular the FM band.

Figure 2:
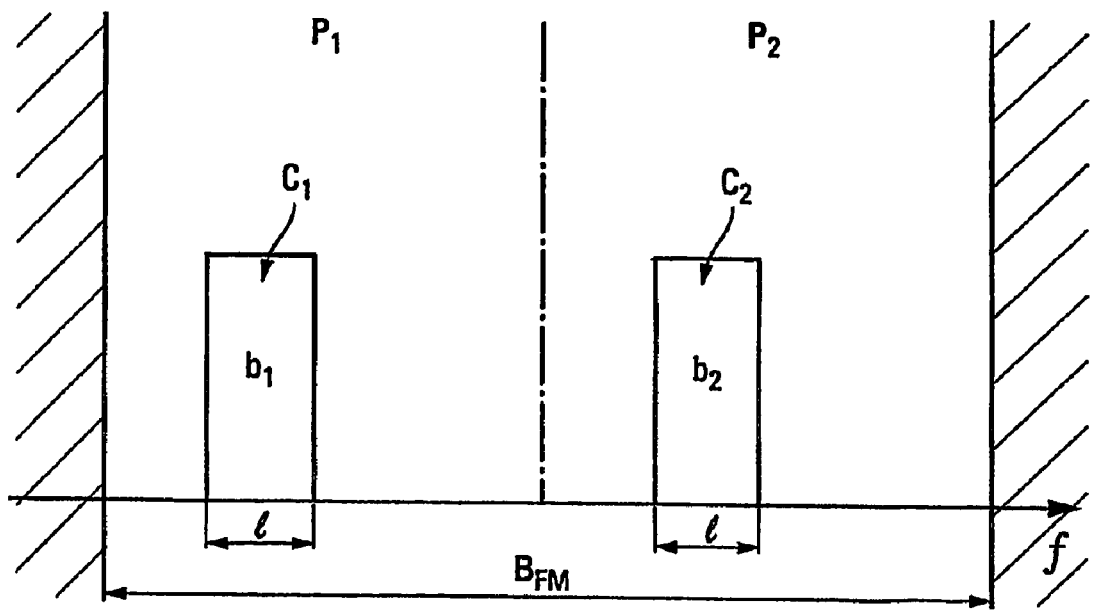

FIG. 2 represents the use of the FM band $B_u$ by the digital signal during its transmission. In the case illustrated by FIG. 2, the modulation proposed is a simplified version of the method of modulation according to the invention. Specifically, the method of modulation divides the digital signal s[m] into two blocks $b_1$ and $b_2$. The digital signal s[m] having a frequency width equal to L, each of the two blocks $b_1$ and $b_2$ has a respective frequency width $l_1$ and $l_2$ such that their sum is equal to that of the signal s[m]: $l_1 + l_2 = L$. In the case of FIG. 2, the widths of the two blocks $b_1$ and $b_2$ are equal $l_1 = l_2 = l = L/2$. The FM band is itself divided into two parts P1 and P2. In each of these parts P1 and P2 is defined a channel $C_1$, respectively $C_2$, of width L in which the signal of the associated block $b_1$, respectively $b_2$, will be distributed. In order to transpose the DRM standard to the FM band, the blocks $b_1$ and $b_2$ may be of l=20 KHz in width.

The frequency band, regardless of its use may be occupied by several digital signals originating from one or more operators. For example, several operators share the FM band to broadcast radiophonic transmissions.

Figure 3:
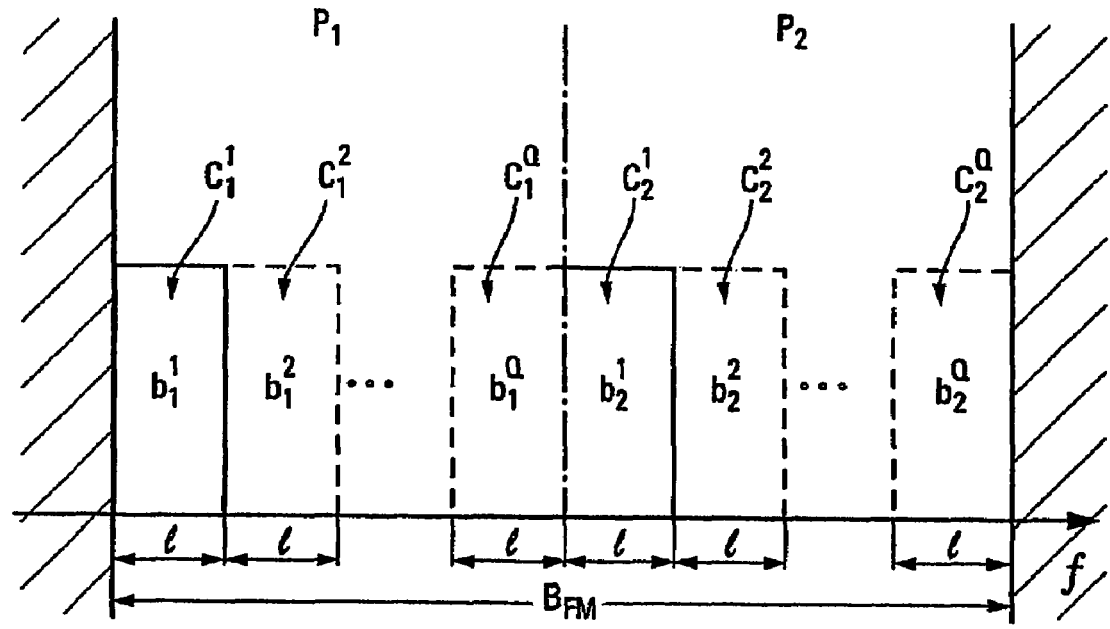

FIG. 3 illustrates this sharing of the FM band by several digital signals. Each of the Q signals $\{s^q[m]\}_{(1 \leq q \leq Q)}$ is divided into two blocks $b^q_1$ and $b^q_2$. As in FIG. 2, the FM band is split into two parts $P_1$ and $P_2$. In each of these parts $P_1$ and $P_2$ are defined Q channels $C^q_1$, respectively $C^q_2$, of width l. In each channel $C^q_n$ is distributed the signal of the associated block $b^q_n$. When one or more minimum distances are determined for the channels $\{C^1_n\}$, on which the blocks $b^1_n$ of a signal $s^1[m]$ are distributed, they are identical for the channels $\{C^q_n\}$, on which the blocks $b^q_n$ of all the signals $s^q[m]$ are distributed.

The number of parts $P_n$ is not limited to two, but can depend on the mean width of the frequency band affected by the flat fading. For example, the given useful frequency band may be divided into part having a width equal to the mean width of the frequency band affected by the flat fading.

The width of the channels $C^q_n$ is not necessarily identical in all the parts $P_n$. However, the width of all the channels $C^q_n$ of a given part $P_i$ is identical ($l^1_i = l^2_i = \ldots = l^Q_i$).

Figure 4:
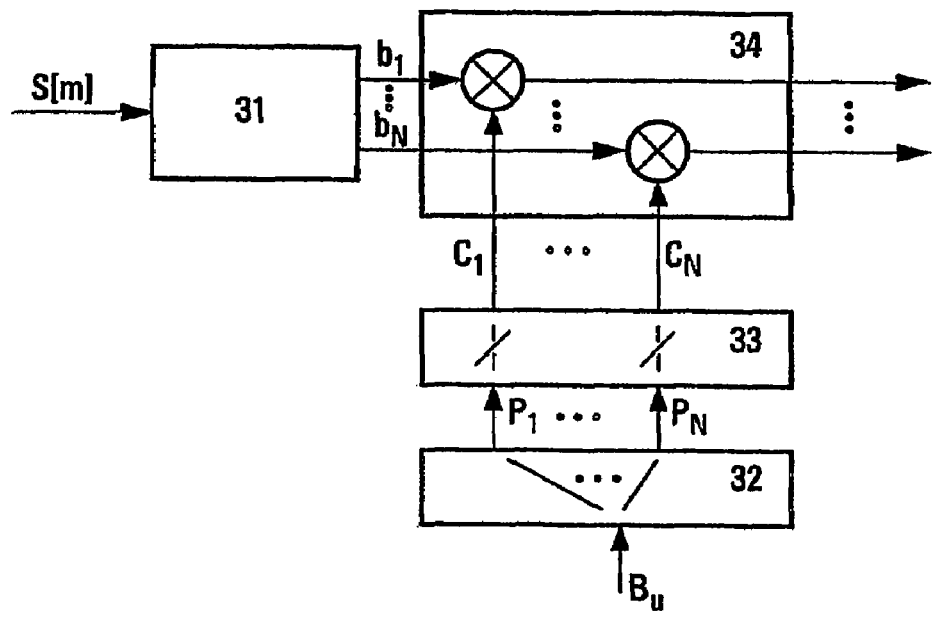

FIG. 4 proposes a simplified block diagram of the modulator according to the invention. The modulator 30 receives a digital signal s[m] at the input of its means of separation 31 of the digital signal into N blocks $b_n$. The modulator 30 receives the characteristics of the given useful frequency band $B_u$ in which the signal s[m] is to be transmitted. The knowledge through these characteristics of the given useful frequency band $B_u$ makes it possible for the splitting means 32 to divide the band $B_u$ into N parts $P_n$. The characteristics of the N parts $P_n$ are conveyed by the splitting means 32 to the means of definition 33. The means of definition 33 determines the channel $C_n$ of width $l_n$ corresponding to each of the N parts $P_n$. To each channel $C_n$ there corresponds a block $b_n$ of like width $l_n$. Thus, the N blocks of signals $b_n$ at the output of the means of separation and the characteristics of the N channels $C_n$ at the output of the means of definition 33 are conveyed to the input of the distributing means 34. The distributing means 34 assign each block $b_n$ to the associated channel $C_n$ making it possible to obtain a distribution of the signal over the given useful frequency band $B_u$, as represented by FIG. 1.

Figure 5:
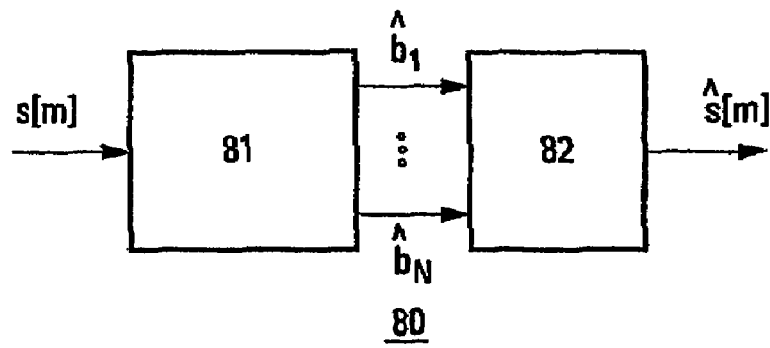

FIG. 5 proposes a representation in the form of a simplified block diagram of a demodulator 80 of digital signals conveyed on a given useful frequency band by a transmitter comprising a modulator such as that illustrated by FIG. 4. The signal received r[m] is of the form of that represented by FIG. 1. This signal received r[m] is conveyed to means of scanning 81 of the N channels $C_n$. The means of scanning 81 extract from each of these N channels $C_n$ the block $\hat{b}_n$ received corresponding to the block $b_n$ transmitted. The N blocks $\hat{b}_n$ read are conveyed to the means of recombination 82. These means of recombination 82 reconstitute on the basis of the N blocks $\hat{b}_n$ read from the N channels $C_n$ a digital signal $\hat{s}[m]$ corresponding to the signal s[m] transmitted in the form of the N blocks $b_n$.

Figure 6:
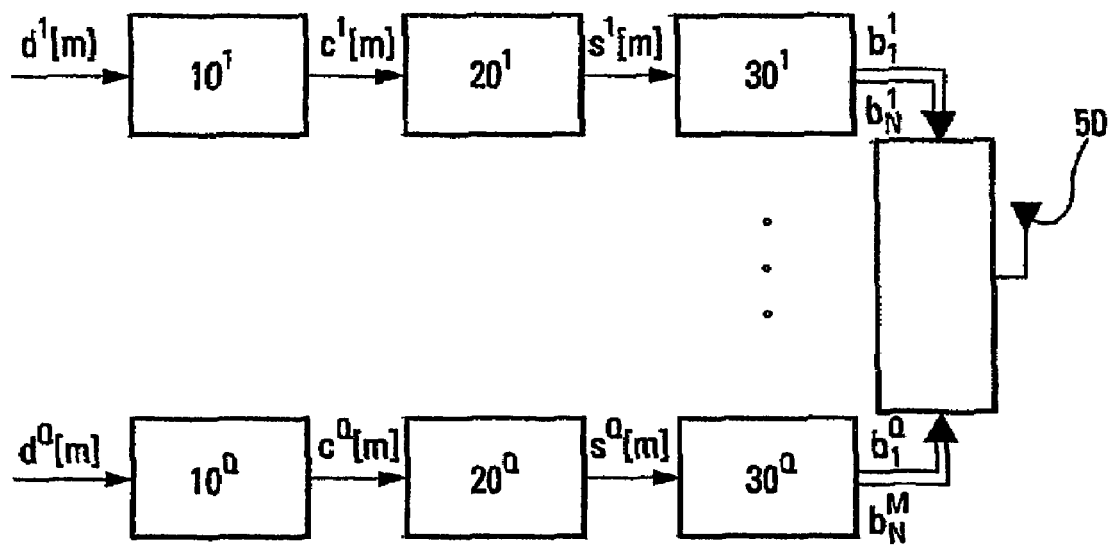

FIG. 6 illustrates a transmitter according to the invention. The transmitter proposed comprises Q transmission chains, one per signal to be transmitted in the given useful frequency band. Each chain receives the data to be transmitted $d^q[m]$. These data $d^q[m]$ may, for example, be coded by an error corrector code $10^1$. The coded data $c^q[m]$ may be mixed, in particular, with the aid of an interleaver $20^q$. The signal $s^q[m]$ is obtained at the output of all the preprocessings of the transmission chain, such as the error corrector coding, the interleaving, etc, is then processed by the modulator $30^q$ according to the invention.

If the transmitter (such as that illustrated by FIG. 6) comprises, several transmission chains, the blocks $b^q_n$ of each of the Q transmission chains may be conveyed to a multiplexer 40 linked to an antenna 50. When the useful band of given frequencies is divided into two parts, the distribution of the signals transmitted by the antenna 50 may be represented such as in FIG. 3.

If the transmitter comprises just one transmission chain, the modulator 30 can be linked directly to the antenna 50. The distributing of the signals by the various transmitters over the given useful frequency band may be performed by allocating to the transmitters using this band: the number N of parts, the minimum distance or distances between the channels and a frequency, on the basis of all of which the transmitter will be capable of defining by virtue of the means of definition 33 of the modulator 30 the channels on which it can transmit without interfering with the other transmitters sharing this band.

Figure 7:
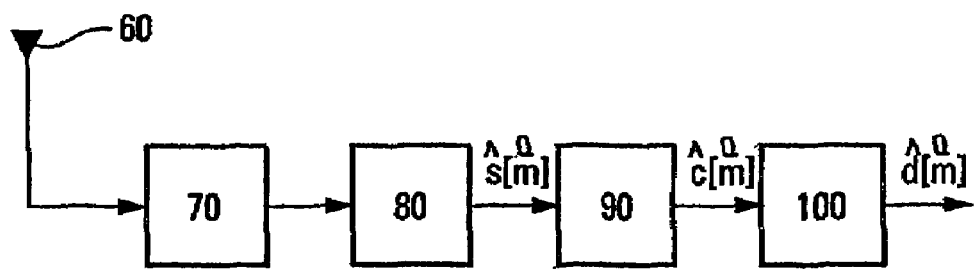

FIG. 7 illustrates a receiver according to the invention. This receiver of digital signals is suitable for the reception of digital signals conveyed on a given useful frequency band by a transmitter such as that of FIG. 6.

The antenna 60 conveys the signals received on the given useful frequency band to selection means 70. These selection means convey to the demodulator 80 the signal received r[m] and the characteristics of the channels $C^q_n$ comprising the blocks $\hat{b}^q_n$ of the signal $s^q[m]$ that the receiver must reproduce. The demodulator 80 thus recombines the blocks $\hat{b}^q_n$ read from the N channels $C^q_n$ into a signal $\hat{s}^q[m]$ corresponding to the signal $\hat{s}^q[m]$ transmitted.

If the transmitter comprises an interleaver 20, the receiver will comprise an associated deinterleaver 90 so as to reinstate the demodulated signal $\hat{s}^q[m]$. The deinterleaved signal $\hat{c}^q[m]$ is conveyed to a decoder 100 when the transmitter also comprises a channel coder 10. The decoder 100 is associated with the channel coder 20. At the output of the decoder 100, the receiver provides the data $\hat{d}^q[m]$ corresponding to the data transmitted $d^q[m]$.

The receiver can also be envisaged with a decoder 100 and without deinterleaver 90, when the transmitter comprises a coder 10 but no interleaver 20. The output of the demodulator 80 is then linked directly to the input of the decoder 100.

The assembly of devices described by FIGS. 4 to 7 may be used for digital transmission in the FM band, in particular for radio broadcasting. The sound quality thus obtained is akin to that of digital audio storage means, such as that of the compact disc. Furthermore, the FM band has the advantage of allowing the broadcasting of local programs: regional music programs, local retransmission of concerts, etc.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of modulating a digital signal of width L in frequency on a given useful frequency band comprising:
    separating the digital signal into N blocks $b_n$ ($1 \leq n \leq N$),
    splitting the given useful frequency band into N contiguous parts $P_n$,
    defining channels $C_n$, of width $l_n$ in frequency such that their sum is equal to L, $$\sum_{n=1}^{N} l_n = L$$

lying within an associated part $P_n$, the channels $C_n$ being separated, and
    distributing each block of digital signals $b_n$ over the associated channel $C_n$,
    wherein the channels $C_n$ are defined by taking account of a predetermined minimum distance between the channels to allow a predetermined maximum number of blocks to be affected by the phenomenon of flat fading,
    wherein the predetermined minimum distance between the channels is determined as a function of the number N of channels, of their width $l_n$, and of a mean width of the frequency band affected by the phenomenon of flat fading so that the loss of information is not abrupt.

2. The method of modulation as claimed in the claim 1, wherein the minimum distance is determined such that a minority of channels $C_n$ are affected by the phenomenon of flat fading.

3. The method of modulation as claimed in the claim 1, wherein the channels $C_n$ are of identical widths equal to an Nth of the width of the digital signal L: $l_n = L/N$, $\forall\ 1 \leq n \leq N$.

4. The method of digital modulation as claimed in the claim 1 wherein:

the digital signal is separated into N=2 blocks $b_n$,
the given useful frequency band is split into N=2 parts $P_n$,
a first block $b_1$ is distributed over a channel $C_1$ of width L/2 lying within a first part $P_1$ of the given useful frequency band and a second block $b_1$ is distributed over a channel $C_2$ of width L/2 lying within a second part $P_2$ of the given useful frequency band.

5. The method of modulation as claimed in the claim 1, wherein the given useful frequency band is the FM band.

6. A modulator of digital signals over a given useful frequency band implementing a method of modulation comprising:
  means for separating the digital signal into N blocks $b_n$ ($1 \leq n \leq N$),
  means for splitting the given useful frequency band into N contiguous parts $P_n$,
  means for defining channels $C_n$ of width $l_n$ in frequency, such that their sum is equal to L, $$L, \sum_{n=1}^{N} l_n = L.$$

lying within the associated part $P_n$,
  means for distributing each block of digital signals $b_n$ over the associated channel $C_n$,
  wherein the channels $C_n$ are defined by taking account of a predetermined minimum distance between the channels to allow a predetermined maximum number of blocks to be affected by the phenomenon of flat fading,
  wherein the predetermined minimum distance between the channels is determined as a function of the number N of channels, of their width $l_n$, and of a mean width of the frequency band affected by the phenomenon of flat fading so that the loss of information is not abrupt.

7. A demodulator of digital signals conveyed on a given useful frequency band by a transmitter comprising a modulator of the digital signals over the given useful frequency band implementing a method of modulation, comprising:
  means of scanning of the N channels $C_n$ enabling reading of the N blocks $b_n$ of signals distributed over these channels,
  means of recombination of the N blocks read $\hat{b}_n$ in the N channels $C_n$ into a digital signal $\hat{s}[m]$,
  wherein said modulator comprises:
    means for separating the digital signal into the N blocks $b_n$ ($1 \leq n \leq N$),
    means for splitting the given useful frequency band into N contiguous parts $P_n$,
    means for defining the channels $C_n$ of width $l_n$ in frequency, such that their sum is equal to L, $$L, \sum_{n=1}^{N} l_n = L.$$

lying within the associated part $P_n$,
  means for distributing each block of digital signals $b_n$ over the associated channel $C_n$
  wherein the channels $C_n$ are defined by taking account of a predetermined minimum distance between the channels to allow a predetermined maximum number of blocks to be affected by the phenomenon of flat fading,
  wherein the predetermined minimum distance between the channels is determined as a function of the number N of channels, of their width $l_n$, and of a mean width of the frequency band affected by the phenomenon of flat fading so that the loss of information is not abrupt.

8. A transmitter of digital signals on a given useful frequency band comprising at least one transmission chain comprising a modulator of the digital signals over the given useful frequency band implementing a method of modulation, wherein the transmission chain comprises an error corrector coder conveying the coded digital signal $c^q[m]$ to the modulator, and
  said modulator comprises:
    means for separating the digital signal into N blocks $b_n$ ($1 \leq n \leq N$),
    means for splitting the given useful frequency band into N contiguous parts $P_n$,
    means for defining channels $C_n$ of width $l_n$ in frequency, such that their sum is equal to L, $$L, \sum_{n=1}^{N} l_n = L.$$

lying within the associated part $P_n$,
    means for distributing each block of digital signals $b_n$ over the associated channel $C_n$
    wherein the channels $C_n$ are defined by taking account of a predetermined minimum distance between the channels to allow a predetermined maximum number of blocks to be affected by the phenomenon of flat fading,
    wherein the predetermined minimum distance between the channels is determined as a function of the number N of channels, of their width $l_n$, and of a mean width of the frequency band affected by the phenomenon of flat fading so that the loss of information is not abrupt.

9. The transmitter as claimed in the claim 8, wherein the transmission chain comprises an interleaver placed between the error corrector coder and the modulator.

10. The transmitter as claimed in the claim 8, wherein a distinct set of channels $\{C^q_n\}$ is associated with each of the Q transmission chains.

11. Use of the transmitter as claimed in claim 8 conveying digital signals in the FM band.

12. A receiver of digital signals conveyed on a given useful frequency band by a transmitter comprising a demodulator,
  wherein said transmitter of the digital signals on the given useful frequency band comprising at least one transmission chain comprising a modulator of the digital signals over the given useful frequency band implementing a method of modulation,
  wherein the transmission chain comprises an error corrector coder conveying the coded digital signal $c^q[m]$ to the modulator, and
  said modulator comprises:
    means for separating the digital signal into N blocks $b_n$ ($1 \leq n \leq N$),
    means for splitting the given useful frequency band into N contiguous parts $P_n$,
    means for defining channels $C_n$ of width $l_n$ in frequency, such that their sum is equal to L, $$L, \sum_{n=1}^{N} l_n = L.$$

lying within the associated part $P_n$,
means for distributing each block of digital signals $b_n$ over the associated channel $C_n$
wherein the channels $C_n$ are defined by taking account of a predetermined minimum distance between the channels to allow a predetermined maximum number of blocks to be affected by the phenomenon of flat fading,
wherein the predetermined minimum distance between the channels is determined as a function of the number N of channels, of their width $l_n$, and of a mean width of the frequency band affected by the phenomenon of flat fading so that the loss of information is not abrupt,
wherein said demodulator of digital signals conveyed on the given useful frequency band by the transmitter comprising the modulator of the digital signals over the given useful frequency band implementing the method of modulation, comprising:
means of scanning of the N channels $C_n$ enabling reading of the N blocks $b_n$ of signals distributed over these channels,
means of recombination of the N blocks read $\hat{b}_n$ in the N channels $C_n$ into a digital signal $\hat{s}[m]$,
wherein a decoder associated with the error corrector coder of the transmitter receiving the digital signal recombined $\hat{s}[m]$ by the demodulator,
wherein the given useful frequency band is the FM band.

13. A receiver of digital signals conveyed on a given useful frequency band by a transmitter comprising a demodulator,
wherein said transmitter of digital signals on a given useful frequency band comprising at least one transmission chain comprising a modulator of the digital signals over the given useful frequency band implementing a method of modulation,
wherein the transmission chain comprises an error corrector coder conveying the coded digital signal $c^q[m]$ to the modulator, and
said modulator comprises:
means for separating the digital signal into N blocks $b_n$ ($1 \leq n \leq N$),
means for splitting the given useful frequency band into N contiguous parts $P_n$,
means for defining channels $C_n$ of width $l_n$ in frequency, such that their sum is equal to L, $$L, \sum_{n=1}^{N} l_n = L.$$

lying within the associated part $P_n$,
means for distributing each block of digital signals $b_n$ over the associated channel $C_n$
wherein the channels $C_n$ are defined by taking account of a predetermined minimum distance between the channels to allow a predetermined maximum number of blocks to be affected by the phenomenon of flat fading,
wherein the predetermined minimum distance between the channels is determined as a function of the number N of channels, of their width $l_n$, and of a mean width of the frequency band affected by the phenomenon of flat fading so that the loss of information is not abrupt, wherein the transmission chain further comprises an interleaver placed between the error corrector coder and the modulator,
wherein said demodulator of digital signals conveyed on the given useful frequency band by the transmitter comprising the modulator of the digital signals over the given useful frequency band implementing the method of modulation, comprises:
means of scanning of the N channels $C_n$ enabling reading of the N blocks $b_n$ of signals distributed over these channels,
means of recombination of the N blocks read $\hat{b}_n$ in the N channels $C_n$ into a digital signal $\hat{s}[m]$,
wherein
a deinterleaver associated with the interleaver of the transmitter receiving the digital signal recombined $\hat{s}[m]$ by the demodulator,
a decoder associated with the error corrector coder of the transmitter receiving the digital signal recombined deinterleaved $\hat{c}[m]$ by the deinterleaver,
wherein the given useful frequency band is the FM band.

* * * * *